United States Patent Office 3,193,452
Patented July 6, 1965

3,193,452
SYNERGISTIC PESTICIDAL COMPOSITIONS CONTAINING CARBAMATES AND PROSPHATES
Albert Jäger, Berlin-Hermsdorf, and Horst Peissker, Berlin-Charlottenburg, Germany, assignors to Schering A.G., Berlin, Germany
No Drawing. Filed Nov. 9, 1961, Ser. No. 151,167
Claims priority, application Germany, Nov. 18, 1960, Sch 28,796; Feb. 15, 1961, Sch 29,235, Sch 29,236
1 Claim. (Cl. 167—22)

This invention relates to pesticidal compositions, and more particularly to pesticidal compositions containing two active agents which synergistically enhance the pesticidal effects of each other.

Synergistic combinations of pesticidal agents have heretofore been known. Several known synergistic pesticide combinations have effects which are substantially greater than the sum of the effects available from the individual constituents per se. An example of such a synergistic combination is a pesticide containing allethrin or pyrethrin in conjunction with piperonyl butoxide, methylenedioxyphenylacetal or the n-octyl sulfoxide of isosafrol.

No method has heretofore been devised for predicting synergistic effects of pesticidal agents, particularly where their chemical structure greatly differs. Even closely related compounds may differ in their pesticidal effects in the presence of a third compound.

It has now been found that strong synergism exists between the constituents of pesticidal compositions which include a carbamate of the formula

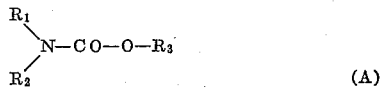

and a phosphoric acid ester of the formula

In the above formulas, $R_1$, $R_2$ may be hydrogen or lower alkyl. $R_3$ is a cyclic radical which may have a benzene, naphthalene, or pyrazole ring. $R_4$ and $R_5$ are lower alkyl. Y stands for a variety of radicals as will presently become apparent, and X may be either oxygen or sulfur.

When employed jointly with the carbamates of Formula A very small amounts of many phosphoric acid esters of Formula B show substantial synergistic effects, although the same phosphoric acid esters do not have any significant pesticidal effect when employed in the customary amounts of 0.8 mg. per square decimeter of treated surface, and even at 1.0 mg./dm.$^2$.

The synergistic pesticidal mixtures of the invention may be employed as such, or in combination with other pesticides such as insecticidal, acaricidal or fungicidal agents. Compositions may be formulated in a known manner on the basis of the synergistic mixtures of the invention to suit the mode of application and the parasites to be affected.

The pesticidal compositions of the invention may thus include liquid or solid carriers or diluents well known in themselves. Suitable liquid carriers include water, mineral oil fractions, and solvents. Solid carriers entirely compatible with the synergistic mixtures of the invention include bentonite, fuller's earth, gypsum, limestone, diatomaceous earth, pyrophyllite, silica, and talcum. Known surface active agents and other adjuvants may be admixed in a manner conventional per se. Such agents and adjuvants which are generally useful in conjunction with the pesticidal synergistic mixtures of the invention include emulsifiers, wetting agents, binders, propellant gases, perfumes, stabilizers attracting and repelling agents. The compositions resulting from combination of the synergistic agents of the invention with carriers, adjuvants, and like substantially non-toxic materials may be in a state of comminution which makes them suitable for application by dusting or spreading. They may be powdery mixes or granulated solids. Liquid compositions may be suitable for application in jets, coarse sprays, or as fog-like dispersions. They may be incorporated in aerosol compositions and in fumigants.

The amounts of the synergistic mixtures which are suitable for use in the protection of crop plants against acarids or mites and insects may vary within wide limits. The quantities to be employed vary with the ratio of the synergistic components in the mixture, with the method of preparing the pesticidal compositions, with the mode of application, with the desired result, and with the nature of the parasites controlled. The pesticidal composition may contain between approximately 0.1 percent and 90 percent of the individual active agents, and the synergistic mixture may be employed successfully in concentrations as low as 0.001 percent by weight. Generally, concentrations between 0.025 percent and 10 percent of the synergistic mixtures in liquid or solid carriers will be found most useful. Higher concentrations up to about 20 percent by weight will be more advantageous only under exceptional conditions.

The ratio of the components of the synergistic mixtures may vary between approximately 0.5 to 20 parts by weight of the phosphoric acid ester of Formula B for each part of carbamate of Formula A. A ratio of 2 to 10 parts phosphoric acid ester to one part carbamate is preferred.

The synergistic effects of the carbamates and phosphoric acid esters of the invention when employed jointly are evident from the following illustrative examples. Comparative tests, the results of which are listed in the tables, were performed under closely controlled uniform conditions. The results reported in Table I and II hereinfollowing constitute averages of three series of tests.

EXAMPLE I

TEST ON HOUSE FLIES

Carbamates and phosphoric acid esters were mechanically emulsified in water separately and jointly as shown in Table I. The emulsions were sprayed on glass plates and permitted to dry, leaving a coating each square decimeter of which contained the amounts of active agents indicated in the table. The coated glass plates were employed as covers on glass cylinders each of which contained 25 house flies (Musca domestica L.) of a strain normally sensitive to insecticides. The flies were three to four days old. After the period indicated, the dead flies, damaged flies, and flies surviving without showing symptoms of damage were counted, and the percentage efficiency of the agent or combination of agents in the coating was calculated according to Abbott's formula.

The compounds employed in the tests on house flies are identified by code designations as follows:

(A) Carbamates ($A_1$) N-methyl-(3-methyl-5-isopropylphenyl)-carbamate

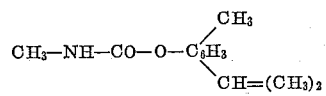

($A_2$) N-methyl-(3-methyl-6-isopropylphenyl)-carbamate
($A_3$) N-methyl-phenylcarbamate
($A_4$) N-methyl-α-napthylcarbamate (A₅) N-dimethyl-(3-methyl-5-isopropylpyrazolyl)-carbamate

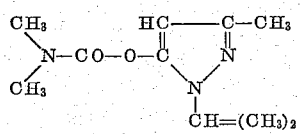

(B) *Phosphoric acid ester amides*

(B₁) O,O'-diethyl ester of N-ethylamidothionophosphoric acid

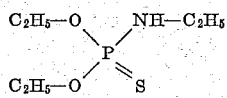

(B₂) O,O'-diethyl ester of N-camphyl-amidothionphosphoric acid

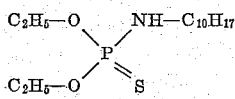

(B₃) O,O'-diethyl ester of N-cyclooctylamido-thionophoric acid

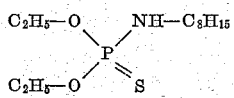

(B₄) O,O'-diethyl ester of N-diethylamido-thionophosphoric acid

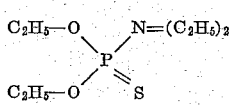

(B₅) O,O'-diethyl ester of N-cyclohexylamido-thionophosphoric acid
(B₆) N-(O,O'-diethyl-thionophosphoryl)-morpholine

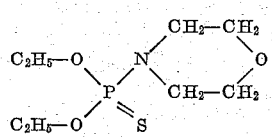

(B₇) N-(O,O'-diethyl-thionophosphoryl-piperidine
(B₈) O,O'-diethyl ester of N-cyclohexylamidophosphoric acid

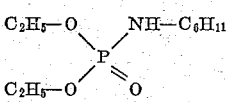

TABLE I

| Active compounds | Dosage of active compound(s) in mg./dm.² | Percent efficiency after 24 hours |
|---|---|---|
| A₁ | 0.008 | 17 |
| A₁ | 0.016 | 23 |
| A₂ | 0.02 | 9 |
| A₃ | 0.1 | 0 |
| A₄ | 0.2 | 15 |
| A₅ | 0.025 | 0 |
| B₁ | 0.8 | 0 |
| B₁+A₁ | 0.08+0.016 | 38 |
| B₂ | 0.1 | 5 |
| B₂+A₁ | 0.032+0.016 | 83 |
| B₂+A₂ | 0.1+0.02 | 76 |
| B₂+A₅ | 0.024+0.012 | 52 |
| B₃+A₁ | 0.08+0.016 | 100 |
| B₃+A₃ | 0.2+0.1 | 81 |
| B₃+A₄ | 0.4+0.2 | 48 |
| B₄+A₁ | 0.08+0.016 | 41 |
| B₅+A₁ | 0.16+0.016 | 100 |
| B₆+A₁ | 0.16+0.016 | 64 |
| B₇+A₁ | 0.08+0.016 | 38 |
| B₇+A₄ | 0.4+0.2 | 47 |

EXAMPLE II

TESTS ON GRANARY WEEVILS

Carbamates and phosphoric acid esters in aqueous emulsions were applied to the lower halves of Petri dishes in the same manner as in Example 1. After the coating had dried, 100 to 120 granary weevils (*Calandra granaria* L.) were placed in each open dish. The weevils that had died, were lying on their backs, showed symptoms of damage, and survivors without noticeable symptoms were counted, and the percentage efficiency of the tested coatings was determined according to Abbott's formula.

In addition to compounds identified in Example I, the following carbamates and phosphoric acid ester amides were employed in the tests the results of which appear in Table II.

(B) *Phosphoric acid ester amides*

(B₉) O,O'-diethyl ester of N-4-methylphenyl amidophosphoric acid

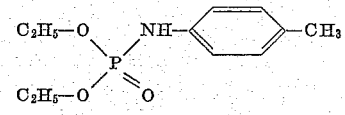

(B₁₀) O,O'-diethyl ester of N-ethylamidophosphoric acid

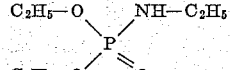

(B₁₁) N-(O,O'-diethylphosphoryl)-morpholine

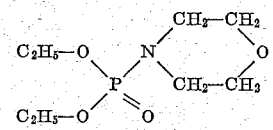

(B₁₂) N-(O,O'-diethylphosphoryl)-piperidine

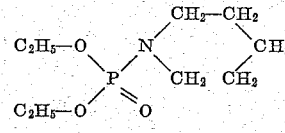

TABLE II

| Active compounds | Dosage of active compound(s) in mg./dm.² | Percent efficiency after 24 hours |
|---|---|---|
| A₁ | 0.016 | 17 |
| B₁ | 0.8 | 0 |
| B₁+A₁ | 0.08+0.016 | 92 |
| B₂ | 0.4 | 6 |
| B₂+A₁ | 0.08+0.016 | 99 |
| B₃+A₁ | 0.08+0.016 | 100 |
| B₄+A₁ | 0.08+0.016 | 86 |
| B₅+A₁ | 0.08+0.016 | 100 |
| B₆+A₁ | 0.08+0.016 | 100 |
| B₇+A₁ | 0.08+0.016 | 93 |
| B₁₀+A₁ | 0.08+0.016 | 100 |
| B₉+A₁ | 0.08+0.016 | 95 |
| B₈+A₁ | 0.08+0.016 | 93 |
| B₁₁+A₁ | 0.08+0.016 | 95 |
| B₁₂+A₁ | 0.08+0.016 | 100 |

EXAMPLE III

TESTS ON HOUSE FLIES

The tests the results of which are listed in Table III were performed in the same manner as in Example I. The coatings produced contained 0.02 mg./dm.² of the carbamate A₁ and amounts of a thionophosphoric acid indicated as a multiple of the amount of A₁. None of the thionophosphoric acid esters identified hereinbelow as B₁₃ to B₃₁ had any effect on house flies when applied singly in amounts up to 0.8 mg./dm.². The results listed in Table III and the subsequent tables are averages of at least five test series.

(B) *Thionophosphoric acid esters*

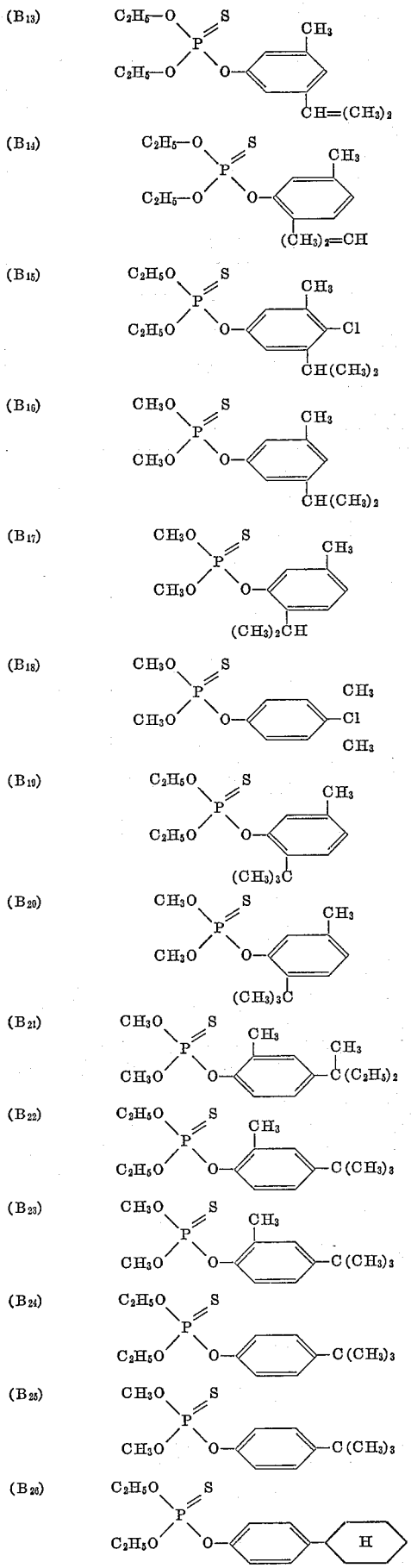

(B) *Thionophosphoric acid esters—Continued*

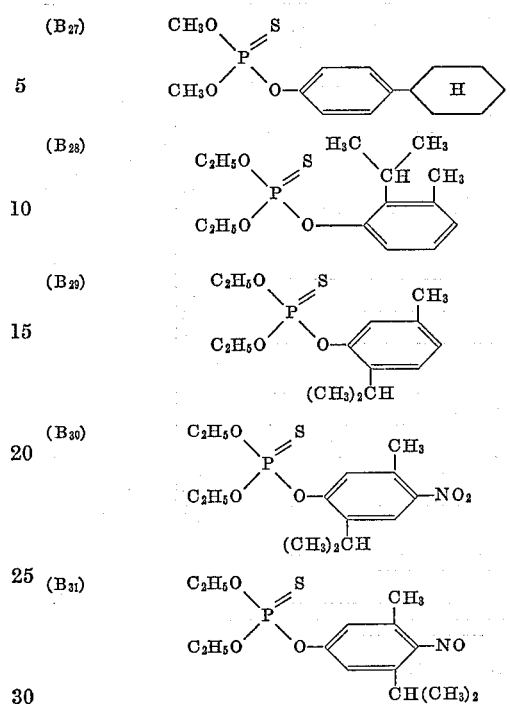

TABLE III

| Thionophosphoric acid ester B employed jointly with 0.02 mg./dm.² of compound A₁ | Ratio A₁:B | Percentage efficiency after 24 hours |
|---|---|---|
| None | 1:0 | 26.5 |
| B₁₃ | 1:1 | 90.0 |
|  | 1:2 | 95.3 |
|  | 1:5 | 100.0 |
| B₁₄ | 1:1 | 88.7 |
|  | 1:2 | 94.4 |
|  | 1:5 | 100.0 |
| B₁₅ | 1:1 | 91.8 |
|  | 1:2 | 96.4 |
| B₁₆ | 1:1 | 96.1 |
|  | 1:2 | 100.0 |
| B₁₇ | 1:1 | 83.0 |
|  | 1:2 | 100.0 |
| B₁₈ | 1:1 | 98.5 |
|  | 1:2 | 100.0 |
| B₁₉ | 1:1 | 83.3 |
|  | 1:2 | 100.0 |
| B₂₀ | 1:1 | 90.5 |
|  | 1:2 | 100.0 |
| B₂₁ | 1:1 | 79.9 |
|  | 1:2 | 90.5 |
| B₂₂ | 1:1 | 95.0 |
| B₂₃ | 1:1 | 88.4 |
|  | 1:2 | 100.0 |
| B₂₄ | 1:1 | 97.2 |
|  | 1:2 | 100.0 |
| B₂₅ | 1:1 | 100.0 |
|  | 1:2 | 100.0 |
| B₂₆ | 1:1 | 85.9 |
|  | 1:2 | 100.0 |
| B₂₇ | 1:1 | 100.0 |
|  | 1:2 | 100.0 |
| B₂₈ | 1:1 | 75.0 |
| B₂₉ | 1:1 | 87.2 |
|  | 1:2 | 100.0 |
| B₃₀ | 1:5 | 88.3 |
| B₃₁ | 1:5 | 80.1 |

EXAMPLE IV

TESTS ON GRANARY WEEVILS

The compounds tested in Example III on house flies were tested on granary weevils by the technique described in Example II. The results obtained on granary weevils are shown in Table IV in which the compounds employed are identified by the code designations used in the preceding examples. 0.8 mg./dm.² of the several thionophosphoric acid esters were without effect on the weevils when employed singly.

TABLE IV

| Thionophosphoric acid ester B employed jointly with 0.02 mg./dm.² of compound A₁ | Ratio A₁:B | Percentage efficiency after 24 hours |
|---|---|---|
| None | 1:0 | 22.1 |
| B₁₃ | 1:2 | 29.7 |
|  | 1:5 | 46.2 |
|  | 1:10 | 71.4 |
| B₁₄ | 1:2 | 40.4 |
|  | 1:10 | 54.8 |
| B₁₅ | 1:1 | 40.0 |
|  | 1:2 | 51.7 |
|  | 1:5 | 66.1 |
|  | 1:10 | 78.8 |
| B₁₆ | 1:5 | 61.7 |
|  | 1:10 | 73.8 |
| B₁₇ | 1:1 | 32.1 |
|  | 1:5 | 51.7 |
| B₁₈ | 1:1 | 57.9 |
|  | 1:2 | 65.8 |
|  | 1:10 | 79.5 |
| B₁₉ | 1:1 | 54.1 |
| B₂₀ | 1:1 | 47.5 |
| B₂₁ | 1:1 | 47.1 |
| B₂₂ | 1:1 | 37.2 |
| B₂₃ | 1:1 | 57.8 |
| B₂₄ | 1:1 | 43.6 |
|  | 1:5 | 58.6 |
| B₂₅ | 1:1 | 51.0 |
|  | 1:5 | 61.0 |
|  | 1:10 | 77.8 |
| B₂₆ | 1:2 | 67.7 |
| B₂₇ | 1:5 | 41.6 |
|  | 1:10 | 65.8 |
| B₂₈ | 1:1 | 55.2 |
| B₂₉ | 1:1 | 53.7 |
| B₃₀ | 1:2 | 57.4 |
|  | 1:10 | 77.0 |

EXAMPLE V

Tests on House Flies

Additional combinations of carbamates and thionophosphoric acid esters were tested on house flies by the technique of Example I. Table V lists the results achieved. Code designations A₂, A₄, A₅, B₁₈ and B₂₅ refer to previously identified compounds. The phosphoric acid derivatives had no effects on house flies when employed in amounts far in excess of that used in the tests reported on in Table V.

In addition to previously identified compounds Table V includes results obtained with the following compounds:

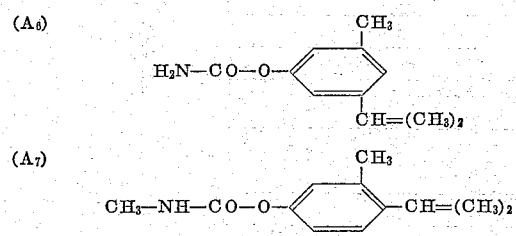

(A₆)

(A₇)

TABLE V

| Active compound(s) | Dosage of A compound mg./dm.² | Ratio A:B | Percentage efficiency after | |
|---|---|---|---|---|
|  |  |  | 2 hours | 24 hours |
| A₂ | 0.04 | 1:0 | 18.8 | 75.0 |
| A₂+B₁₈ | 0.04 | 1:1 | 50.0 | 100.0 |
|  |  | 1:2 | 65.0 | 100.0 |
|  |  | 1:5 | 75.0 | 100.0 |
| A₄ | 0.4 | 1:0 | 0 | 10.0 |
| A₄+B₂₅ | 0.4 | 1:2 | 12.5 | 83.3 |
| A₅ | 0.024 | 1:0 | 5.0 | 5.0 |
| A₅+B₁₈ | 0.024 | 1:2 | 32.5 | 80.0 |
| A₆ | 0.04 | 1:0 | 0 | 13.2 |
| A₆+B₁₈ | 0.04 | 1:1 | 59.1 | 100.0 |
| A₇ | 0.04 | 1:0 | 0 | 0 |
| A₇+B₁₈ | 0.04 | 1:1 | 11.4 | 100.0 |

EXAMPLE VI

Tests on Granary Weevils

Results obtained on granary weevils by the technique of Example II with additional synergistic mixtures of the invention and individual components of these mixtures are listed below. The phosphoric acid derivatives employed were without effect on granary weevils when used in the absence of a carbamate of the invention in amounts up to 1 mg./dm.².

TABLE VI

| Active compound(s) | Dosage of A-compound mg./dm.² | Ratio A:B | Percentage efficiency after 20 hours |
|---|---|---|---|
| A₄ | 0.4 | 1:0 | 6.4 |
| A₄+B₂₅ | 0.4 | 1:1 | 49.7 |
|  | 0.4 | 1:2 | 56.0 |
| A₆ | 0.08 | 1:0 | 32.5 |
| A₆+B₁₈ | 0.08 | 1:1 | 77.2 |

EXAMPLE VII

Tests on House Flies

Tests by the technique of Example I were performed on house flies in a series of experiments in which 0.16 mg./dm.² of carbamate A₁ were combined with phosphoric acid esters in the ratios indicated in Table VII. The phosphoric acid esters listed in Table VII when tested in the absence of a carbamate had no measurable effect on house flies in amounts up to 0.8 mg./dm.² with the exception of compounds B₄₂ and B₄₃ for which the lower limit of efficiency was respectively somewhat above 0.1 and 0.04 mg./dm.².

The following compounds not identified in the preceding examples are listed in Table VII:

(B₃₂) O,O'-diethyl-O''-4-tert-amylphenyl thionophosphate

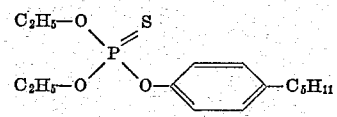

(B₃₃) O,O'-diethyl-O''-4-isovalerylphenyl thionophosphate
(B₃₄) O,O'-diethyl-O''-4-isoheptylphenyl thionophosphate
(B₃₅) O,O'-diethyl-O''-4-(3-oxo-butyl-1)-phenyl thionophosphate
(B₃₆) O,O'-diethyl-O''-phenylphosphate
(B₃₇) O,O'-diethyl-O''-(3-methyl-5-isopropylphenyl) phosphate
(B₃₈) O,O'-diethyl-O''-(3-methyl-4-isopropylphenyl) phosphate
(B₃₉) O,O'-diethyl-O''-4-tert-butylphenyl phosphate
(B₄₀) O,O'-diethyl-O''-(3-methyl-6-isopropylphenyl) phosphate
(B₄₁) O,O'-diethyl-O''-3-methylphenyl phosphate
(B₄₂) O,O'-diethyl-S-phenyl-thiolophosphate

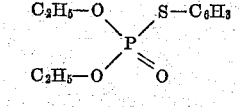

(B₄₃) O,O'-diethyl-S-phenyl dithiophosphate

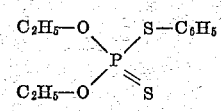

TABLE VII

| Active compound(s) | Ratio $A_1$:B | Percentage efficiency after 24 hours |
|---|---|---|
| $A_1$ | 1:0 | 18 |
| $A_1+B_{32}$ | 1:5 | 100 |
| $A_1+B_{33}$ | 1:5 | 73 |
| $A_1+B_{34}$ | 1:5 | 74 |
| $A_1+B_{35}$ | 1:5 | 88 |
| $A_1+B_{36}$ | 1:5 | 68 |
| $A_1+B_{37}$ | 1:5 | 48 |
| $A_1+B_{38}$ | 1:5 | 50 |
| $A_1+B_{39}$ | 1:5 | 64 |
| $A_1+B_{40}$ | 1:5 | 36 |
| $A_1+B_{41}$ | 1:5 | 45 |
| $A_1+B_{42}$ | 1:5 | 55 |
| $A_1+B_{43}$ | 1:1 | 86 |
|  | 1:2 | 100 |

EXAMPLE VIII

TEST ON GRANARY WEEVILS

Employing the technique of Example II, the synergistic combinations of pesticidal agents tested against house flies in Example VII were used against granary weevils. In these tests, the amount of carbamate compound $A_1$ was 0.02 mg./dm.$^2$. The phosphoric acid ester derivatives listed in Table VIII were entirely ineffective against granary weevils up to amounts of 0.8 mg./dm.$^2$ with the exception of compounds $B_{42}$ and $B_{43}$ for which the lower limits of efficiency were found to be above 0.1 and 0.05 mg./dm.$^2$ respectively.

TABLE VIII

| Active compound(s) | Ratio $A_1$:B | Percentage efficiency after 20 hours |
|---|---|---|
| $A_1$ | 1:0 | 22.1 |
| $A_1+B_{32}$ | 1:5 | 60 |
| $A_1+B_{33}$ | 1:5 | 70 |
| $A_1+B_{34}$ | 1:5 | 51 |
| $A_1+B_{35}$ | 1:5 | 66 |
| $A_1+B_{36}$ | 1:5 | 70 |
| $A_1+B_{37}$ | 1:5 | 88 |
| $A_1+B_{38}$ | 1:5 | 76 |
| $A_1+B_{39}$ | 1:5 | 74 |
| $A_1+B_{40}$ | 1:5 | 88 |
| $A_1+B_{41}$ | 1:5 | 100 |
| $A_1+B_{42}$ | 1:5 | 100 |
| $A_1+B_{43}$ | 1:2 | 100 |

EXAMPLE IX

TEST ON HOUSE FLIES

Several of the phosphoric acid ester derivatives of Examples VII were tested in conjunction with additional carbamate derivatives in their effects on house flies. The technique of Example I was employed. It will be noted that the phosphoric acid ester derivatives listed in Table IX have no measurable effect on house flies in the amounts employed in conjunction with carbamate derivatives.

TABLE IX

| Active compound(s) | Dosage of A-compound mg./dm.$^2$ | Ratio A:B | Percentage efficiency after 2 Hours | Percentage efficiency after 24 Hours |
|---|---|---|---|---|
| $A_2$ | 0.02 | 1:0 | 12 | 48 |
| $A_2+B_{42}$ | 0.02 | 1:5 | 38 | 75 |
| $A_2+B_{43}$ | 0.02 | 1:2 | 36 | 100 |
| $A_4$ | 0.04 | 1:0 | 0 | 0 |
| $A_4+B_{43}$ | 0.04 | 1:1 | 28 | 75 |

While the invention has been described with particular reference to specific embodiments, it is to be understood that it is not limited thereto, but is to be construed broadly and restricted solely by the scope of the appended claim.

We claim:

A pesticidal composition containing as active agent a mixture of (a) a carbamate selected from the group consisting of:
  N-methyl-(3-methyl-5-isopropylphenyl)-carbamate
  N-methyl (3-methyl-6-isopropylphenyl)-carbamate
  N-methyl-phenyl-carbamate
  N-methyl-α-naphthyl-carbamate
  N-dimethyl-(3-methyl-5-isopropylpyrazolyl)-carbamate
  3-methyl-5-isopropylphenyl-carbamate
  N-methyl-(3-methyl-4-isopropylphenyl)-carbamate;
and (b) a phosphoric acid ester selected from the group consisting of:
  O,O'-diethyl-N-ethylamidothionophosphate
  O,O'-diethyl-N-camphylamidothionophosphate
  O,O'-diethyl-N-cyclo-octylamidothionophosphate
  O,O'-diethyl-N-diethylamidothionophosphate
  O,O'-diethyl-N-cyclohexylamidothionophosphate
  N-(O,O'-diethyl-thionophosphoryl)-morpholine
  N-(O,O'-diethyl-thionophosphoryl)-piperidine
  O,O'-diethyl-N-cyclohexylamidophosphate
  O,O'-diethyl-N-4-methylphenylamidophosphate
  O,O'-diethyl-N-ethylamidophosphate
  N-(O,O'-diethylphosphoryl)-morpholine
  N-(O,O'-diethylphosphoryl)-piperidine
  O,O'-diethyl-O''-(3-methyl-5-isopropylphenyl)-thionophosphate
  O,O'-diethyl-O''-(3-methyl-5-isopropyl-4-chlorophenyl-thionophosphate
  O,O'-dimethyl-O''-(3-methyl-5-isopropylphenyl)-thionophosphate
  O,O'-dimethyl-O''-(3-methyl-5-isopropyl-4-chlorophenyl)-thionophosphate
  O,O'-dimethyl-O''-(3-methyl-6-tert.butylphenyl)-thionophosphate
  O,O'-dimethyl-O''-(3-methyl-6-tert.butylphenyl)-thionophosphate
  O,O'-dimethyl-O''-(2-methyl-4-tert.butylphenyl)-thionophosphate
  O,O'-diethyl-O''-4-tert.butylphenyl-thionophosphate
  O,O'-dimethyl-O''-4-tert.butylphenyl-thionophosphate
  O,O'-dimethyl-O''-4-tert.butylphenyl-thionophosphate
  O,O'-diethyl-O''-(3-methyl-5-isopropylphenyl)-phosphate
  O,O'-diethyl-S-phenyl-thiolophosphate
  O,O'-diethyl-S-phenyl-dithiophosphate;
and a carrier therefor; the total concentration of said mixture being between about 0.025% and about 10% by weight of said composition; the ratio of the phosphoric acid ester to the carbamate being between about 2:1 and about 10:1 parts by weight.

References Cited by the Examiner

UNITED STATES PATENTS 2,945,780  7/60  Jones _____ 167—30
2,990,317  6/61  Jones _____ 167—22
2,990,319  6/61  Jones _____ 167—22

OTHER REFERENCES

Frear: Chemistry of the Pesticides, 3rd edition (1955), pages 79, 82 and 83.

LEWIS GOTTS, *Primary Examiner.*

MORRIS O. WOLK, *Examiner.*